United States Patent
Kim et al.

(10) Patent No.: US 7,583,344 B2
(45) Date of Patent: Sep. 1, 2009

(54) LIQUID CRYSTAL DISPLAY DEVICE

(75) Inventors: Kwang Min Kim, Daejeon-kwangyokshi (KR); Ho Jin Ryu, Kyonggi-do (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 11/520,752

(22) Filed: Sep. 14, 2006

(65) Prior Publication Data

US 2007/0008473 A1 Jan. 11, 2007

Related U.S. Application Data

(62) Division of application No. 10/676,252, filed on Oct. 2, 2003, now Pat. No. 7,119,869.

(30) Foreign Application Priority Data

Oct. 16, 2002 (KR) ............... P2002-063116

(51) Int. Cl.
 *G02F 1/1337* (2006.01)
(52) U.S. Cl. ............ 349/123; 349/122; 349/110; 349/38
(58) Field of Classification Search ............ 349/38, 349/39, 110, 111, 123
 See application file for complete search history.

(56) References Cited

U.S. PATENT DOCUMENTS

| | | | |
|---|---|---|---|
| 5,623,354 A * | 4/1997 | Lien et al. .............. 349/124 |
| 5,682,211 A * | 10/1997 | Yao et al. .............. 349/38 |
| 5,689,315 A * | 11/1997 | Fushimi et al. .............. 349/5 |
| 5,710,611 A * | 1/1998 | Suzuki et al. .............. 349/129 |
| 5,783,338 A * | 7/1998 | Cho .............. 430/7 |
| 5,847,781 A * | 12/1998 | Ono et al. .............. 349/44 |
| 5,917,563 A * | 6/1999 | Matsushima .............. 349/38 |
| 5,946,058 A * | 8/1999 | Kamada et al. .............. 349/42 |
| 6,011,604 A * | 1/2000 | Miyazawa .............. 349/110 |
| 6,211,937 B1 | 4/2001 | Miyachi et al. |
| 6,507,375 B1 * | 1/2003 | Kawahata .............. 349/38 |
| 6,879,357 B2 * | 4/2005 | Mima .............. 349/110 |
| 2002/0036741 A1 * | 3/2002 | Lee .............. 349/130 |
| 2002/0118318 A1 * | 8/2002 | Hidehira et al. .............. 349/43 |
| 2002/0191138 A1 * | 12/2002 | Matsumoto et al. .............. 349/141 |

* cited by examiner

*Primary Examiner*—David Nelms
*Assistant Examiner*—David Y Chung
(74) *Attorney, Agent, or Firm*—Morgan Lewis & Bockius LLP

(57) ABSTRACT

A liquid crystal display device is disclosed in the present invention. The liquid crystal display device includes a color filter substrate having a black matrix, and color filter layers at a designated region determined by the black matrix, an array substrate having a gate bus line and a data bus line crossing perpendicularly and defining a unit pixel region, a thin film transistor arranged at an intersection of the gate bus line and the data bus line, a pixel electrode contacting a drain electrode of the thin film transistor and vertically overlapping portions of the gate bus line, the data bus line, an adjacent gate bus line, and an adjacent data bus line, and an organic insulating layer on the pixel electrode and the thin film transistor, wherein a surface of the array substrate is rubbed in a 315 degree direction, and a liquid crystal layer between the array substrate and the color filter substrate.

8 Claims, 6 Drawing Sheets

LIQUID CRYSTAL DISPLAY DEVICE

This application is a Divisional of U.S. patent application Ser. No. 10/676,252, filed Oct. 2, 2003 now U.S. Pat. No. 7,119,869 and claims the benefit of the Korean Patent Application No. P2002-063116 filed on Oct. 16, 2002, both of which are hereby incorporated by reference.

BACKGROUND OF THE INVENTION

1. Field of the Invention

The present invention relates to a liquid crystal display device, and more particularly, to a liquid crystal display device employing an organic insulating layer. Although the present invention is suitable for a wide scope of applications, it is particularly suitable for increasing an aperture ratio of the liquid crystal display device.

2. Discussion of the Related Art

Recently, with the advent of the information age, a display field for processing and displaying mass information has been developed. Until recently, cathode-ray tubes (CRT) have been the main stream of display device and have been developed continuously.

Meanwhile, a flat panel display is increasingly in demand so as to meet the requirements of compact size, lightweight, low power consumption, and the like. Accordingly, a thin film transistor-liquid crystal display (hereinafter, referred to as TFT-LCD) having an excellent color reproduction and a slim size has been developed.

The operation of a TFT-LCD will be described below. If a selected pixel is switched by a thin film transistor, the switched pixel can adjust the amount of light transmission of a lower light source.

An amorphous silicon thin film transistor (a-Si:H TFT) having a semiconductor layer formed of amorphous silicon is usually used as a switching device. This is because the amorphous silicon thin film can be formed at a low temperature on a large-sized insulating substrate, such as a glass substrate.

In the TFT-LCD that is widely used, a backlight unit disposed at a lower portion of the panel has employed a method of displaying images by using the light emitted from the backlight unit.

However, the TFT-LCD is a very inefficient optical modulator because it transmits only 3% to 8% of the light that is emitted from the backlight unit.

For example, when the transmittance of two polarizing plates is 45%, the transmittance of two glasses is 94%, the transmittance of a TFT array and a pixel is about 65%, and the transmittance of a color filter is about 27%, the transmittance of the TFT-LCD would be about 7.4%.

FIG. 1 is a plane view of a pixel structure of a related art liquid crystal display device provided.

Referring to FIG. 1, a plurality of gate bus lines 1 and data bus lines 3a and 3b perpendicularly cross one another on a transparent insulating substrate and defining a plurality of unit pixel regions.

A switching thin film transistor (hereinafter, referred to as TFT) including a gate electrode 7, a source electrode 5a, and a drain electrode 5b is arranged on a region where the gate bus line 1 and the data bus lines 3a and 3b perpendicularly cross one another. A pixel electrode 9a is contacted with the drain electrode 5b of the TFT and parallel with the data bus lines 3a and 3b is arranged on the unit pixel region.

In order to increase an aperture ratio, the pixel electrode 9a overlaps predetermined portions of the left and right data bus lines 3a and 3b defining the unit pixel region.

A process of driving the LCD with the pixel electrode 9a formed to increase an aperture ratio will be described below.

If a driving signal is applied through the gate bus line 1, the TFT arranged in the unit pixel region is turned on. At this point, a graphic signal applied through the data bus line 3a is transferred to the pixel electrode 9a through the TFT.

An electric field is generated due to the graphic signal applied to the pixel electrode 9a. The electric field causes the liquid crystal molecules of the liquid crystal molecules to be twisted. Also, due to the electric field, the transmittance progressed from the backlight is adjusted to reproduce R, G, and B colors.

FIG. 2 is a plane view of a color filter structure of the related art liquid crystal display device.

Referring to FIG. 2, a black matrix 15 formed on the color filter substrate defines the unit pixel regions, and R, G, and B color filter layers 10 are formed on each unit pixel region, respectively. Here, the black matrix 15 is formed by patterning a chrome metal layer so as to arrange the black matrix to correspond to the unit pixel of the array substrate.

In the black matrix 15, a non-transmission region or a disclination region of the unit pixel region formed on the array substrate is isolated and patterned so as to reproduce R, G, and B colors.

As described above, the black matrix 15 defines a space for the color filter layer on the color filter substrate so as to arrange the black matrix 15 to correspond to the unit pixels of the array substrate. Then, the R, G, and B color filter layers 10 are formed on the unit pixel region.

In order to isolate the non-transmission region and the light leakage occurrence region, which are arranged at the unit pixel region of the array substrate, the black matrix 15 blocks each intersection between the gate bus line and the data bus line and the region corresponding to the TFT region.

FIG. 3 is a cross-sectional view of the pixel structure of the related art liquid crystal display device.

Referring to FIG. 3, the R, G, and B color filter layers 10 are arranged on the color filter substrate, and the gate bus line, the data bus line 13, and the switching TFT are arranged on the array substrate. The color filter substrate and the array substrate are attached to each other, so that the liquid crystal layer 18 is interposed therebetween.

As shown in FIG. 3, the black matrix 15 arranged on the color filter substrate and the R, G, and B color filter layer 10 correspond to the pixel electrodes 15a and 15b and the data bus lines 13, respectively.

In order to increase an aperture ratio, an organic insulating layer 14 is used, and the pixel electrodes 15a and 15b arranged on the unit pixel region of the array substrate overlap predetermined portions 'a' and 'b' of the data bus lines 13.

Additionally, the black matrix 15 arranged on the color filter substrate has a width overlapping the data bus lines 13 formed on the array substrate.

As shown in FIG. 3, in order to increase an aperture ratio, a desirable width of the pixel electrode 15a arranged on the array substrate overlaps the data bus line 13 disposed at a boundary region of the unit pixel together with an adjacent pixel electrode 15b. On the other hand, the pixel electrode 15a of the pixel region having the TFTs arranged along the data bus lines 13 overlaps a much wider area of the pixel electrode 15b connected with the TFT of the adjacent data bus line 13.

However, in such an LCD device employing the organic insulating layer to enhance the aperture ratio, a light leakage occurs at a banding edge portion and a pixel edge portion due to an abnormal alignment of liquid crystals, resulting in a disclination. Here, the banding edge portion and the pixel edge portion overlap the gate bus line and the data bus line due to the expansion of the pixel electrode.

Additionally, although the overlapping regions are formed only between the TFT of the array substrate and the data bus line and between the gate bus line and the pixel electrodes so as to increase an aperture ratio, the use of the organic insulating layer causes a light leakage due to a variation of the cell gap.

Further, since the overlapping region is determined while taking only the TFT of the array substrate into consideration, a light leakage may be caused due to a movement of the upper black matrix according to a variation of attachments between the upper and lower substrates.

As described above, the width of the black matrix is expanded so as to prevent a light leakage. However, this causes a problem of reducing an aperture ratio.

SUMMARY OF THE INVENTION

Accordingly, the present invention is directed to a liquid crystal display device that substantially obviates one or more of problems due to limitations and disadvantages of the related art.

Another object of the present invention is to provide a liquid crystal display device in which a light leakage occurring at edge portions of pixel regions is prevented without expanding a width of a black matrix by appropriately overlapping pixel electrodes of unit pixel regions with data bus lines, gate bus lines, and TFTs.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a color filter substrate having a black matrix, and color filter layers formed at a designated region determined by the black matrix, an array substrate having a gate bus line and a data bus line crossing perpendicularly and defining a unit pixel region, a thin film transistor arranged at an intersection of the gate bus line and the data bus line, a pixel electrode contacting a drain electrode of the thin film transistor and vertically overlapping portions of the gate bus line, the data bus line, an adjacent gate bus line, and an adjacent data bus line, and an organic insulating layer on the pixel electrode and the thin film transistor, wherein a surface of the array substrate is rubbed in a 315 degree direction, and a liquid crystal layer between the array substrate and the color filter substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 4:
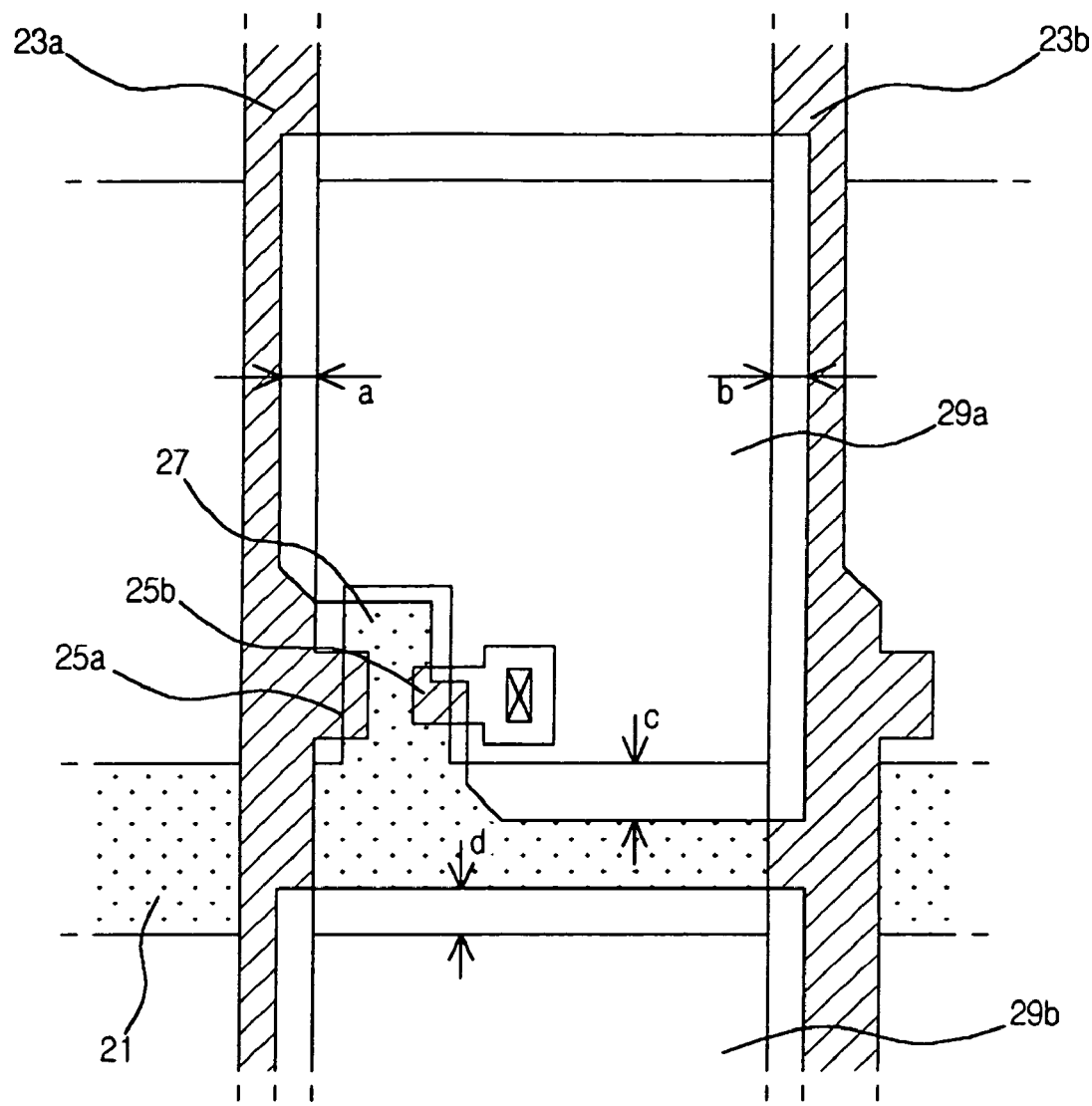
FIG. 4 is a plane view of a pixel structure of a liquid crystal display device according to the present invention.

FIG. 4 is a plane view of a pixel structure of a liquid crystal display device according to the present invention.

As shown in FIG. 4, a plurality of gate bus lines 21 and data bus lines 23a and 23b perpendicularly cross one another on a transparent insulating substrate and define a plurality of pixel regions arranged in a matrix form.

A description of the pixel structure according to the present invention will be focused on a unit pixel region for simplicity. Herein, the gate bus line 21 and the data bus line 23a defining the corresponding unit pixel regions are represented by the Nth gate bus line (Gn:21) and the Nth data bus line (Dn:23a), respectively.

An adjacent gate bus line is represented by the (N−1)th gate bus line (Gn−1), which is disposed at an upper portion of the gate bus line 21, and an adjacent data bus line is represented by the (N+1)th data bus line 23b.

A switching TFT including a gate electrode 27, a source electrode 25a, and a drain electrode 25b is arranged on the region in which the gate bus line (Gn:21) and the data bus line (Dn:23) of the unit pixel region cross one another. A pixel electrode 29a is contacted with the drain electrode of the TFT and overlaps the entire region of the unit pixel and portions of the gate bus line (Gn:21), the data bus line (Dn:23a), the adjacent gate bus line (Gn−1), and the adjacent data bus line (Dn+1:23b).

At this time, the gate electrode 27 of the TFT is formed to protrude from the gate bus line (Gn:21), and the data bus line 23a is formed on the same layer as the source and drain electrodes 25a and 25b of the TFT.

An organic insulating layer is formed on the array substrate on which the TFT and the data bus line 23a are formed. The pixel electrode 29a formed of a transparent metal, such as ITO, is disposed on the organic insulating layer.

Accordingly, the pixel electrode 29a, the gate bus line 21, and the data bus line 23a overlap one another in vertical directions.

Herein, the overlapping widths between the pixel electrode 29a and the gate bus lines 21 and between the pixel electrode and the data bus lines 23a and 23b will be described as follows.

The pixel electrode 29a is disposed on upper portions of the data bus line (Dn:23a) and the adjacent data bus line (Dn+1:23b). Herein, an overlapping width "a" between the pixel electrode 29a and the data bus line (Dn:23a) is in the range of about 3 to 5 micrometers (µm), and an overlapping width "b" between the pixel electrode 29a and the adjacent data bus (Dn+1:23b) is in the range of about 0 to 2 micrometers (µm).

Additionally, the pixel electrode 29a and the adjacent pixel electrode 29b are disposed on an upper portion of the gate bus line (Gn:21). Herein, an overlapping width "c" between the pixel electrode 29a and the gate bus line (Gn:21) is in the range of about 2 to 4 micrometers (μm), and an overlapping width "d" between the adjacent pixel electrode 29b and the gate bus line (Gn:21) is in the range of about 4 to 6 micrometers (μm). Accordingly, it is possible to prevent a light leakage from occurring at edge portions of the pixel regions.

Figure 5:
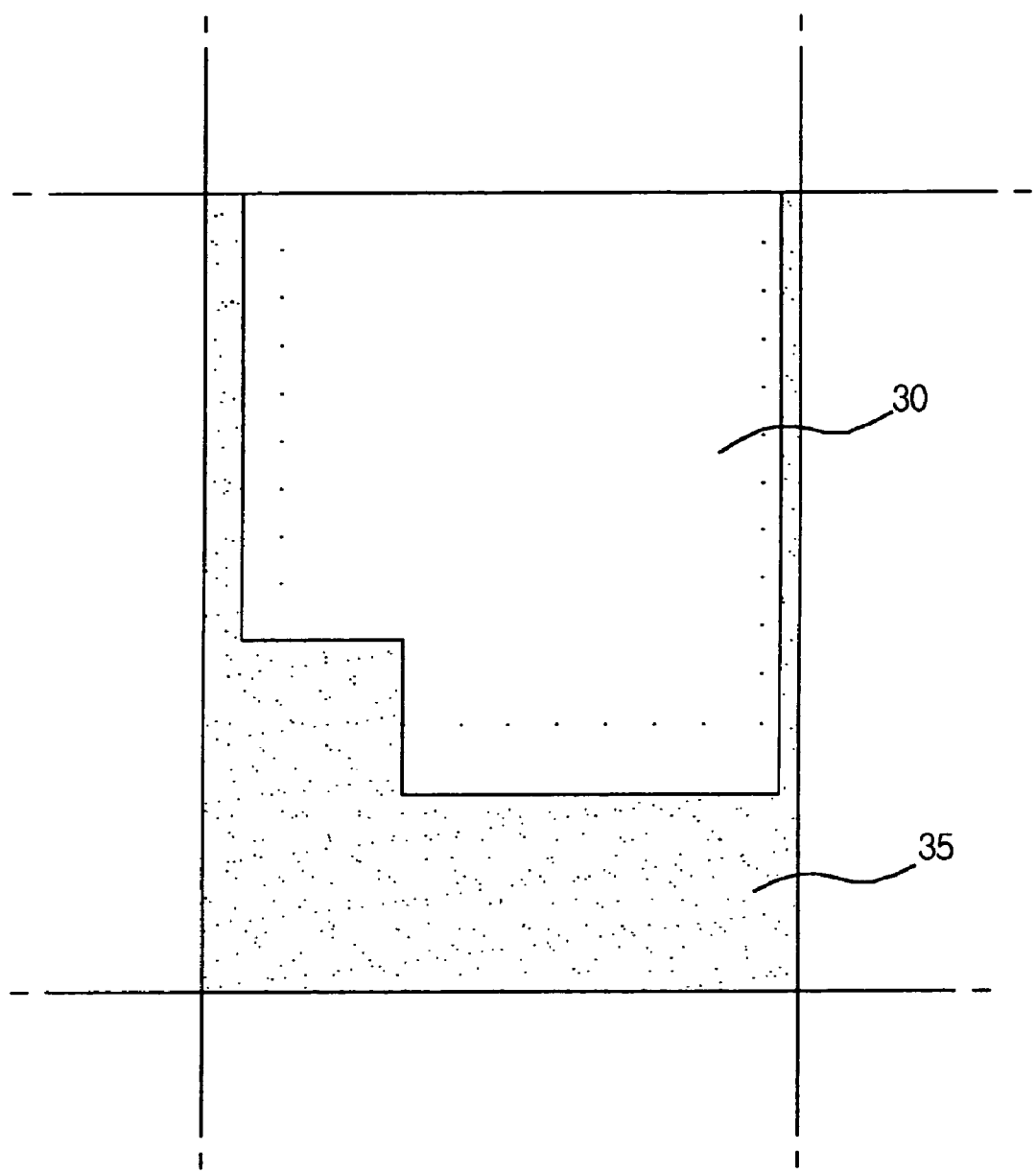
FIG. 5 is a plane view of the liquid crystal display device according to the present invention.

When setting the overlapping widths between the pixel electrode 29a and the gate bus lines 21 and between the pixel electrode and the data bus lines 23a and 23b, the uppermost surface of the array substrate should be rubbed in the 315 degree direction. In this case, liquid crystals interposed between the array substrate and the color filter substrate are twisted in the −90 degree direction, when an electric filed is applied thereto. FIG. 5 is a plane view of a color filter structure according to the present invention.

Referring to FIG. 5, in a structure of a black matrix 35 formed on a color filter 30 corresponding to the pixel region of the array substrate, a width of the black matrix 35 corresponding to a region of the gate bus line (Gn) arranged on the pixel region is equal to or less than half of the width of the gate bus line (Gn), or the black matrix 35 corresponding to the gate bus line may be removed. Also, a width of the black matrix 35 corresponding to the data bus line formed on the array substrate can be reduced to a width equal to or less than half of the width of the data bus line, thereby increasing an aperture ratio.

Figure 1:
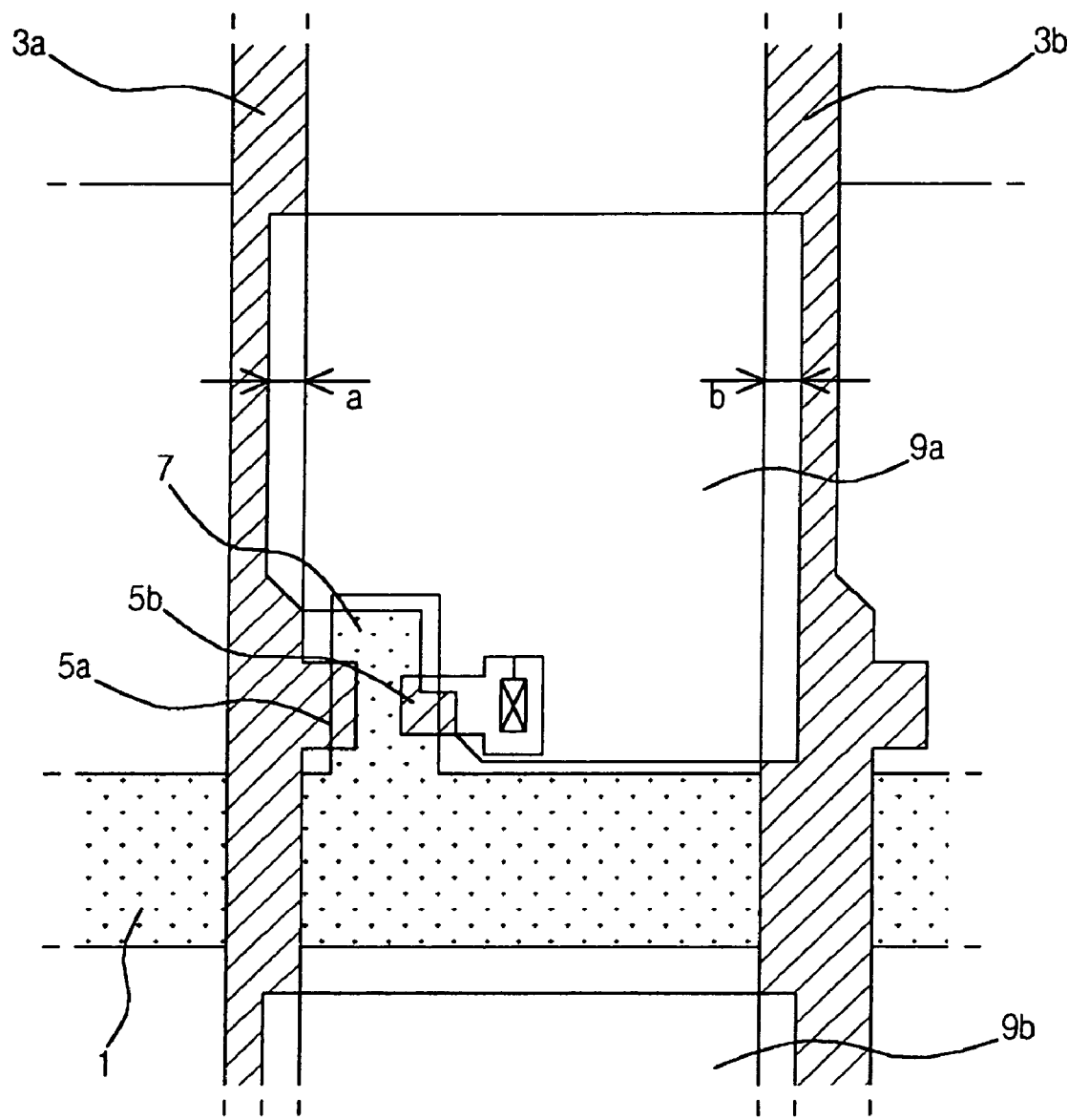
FIG. 1 is a plane view of a pixel structure of the related art liquid crystal display device.
Figure 2:
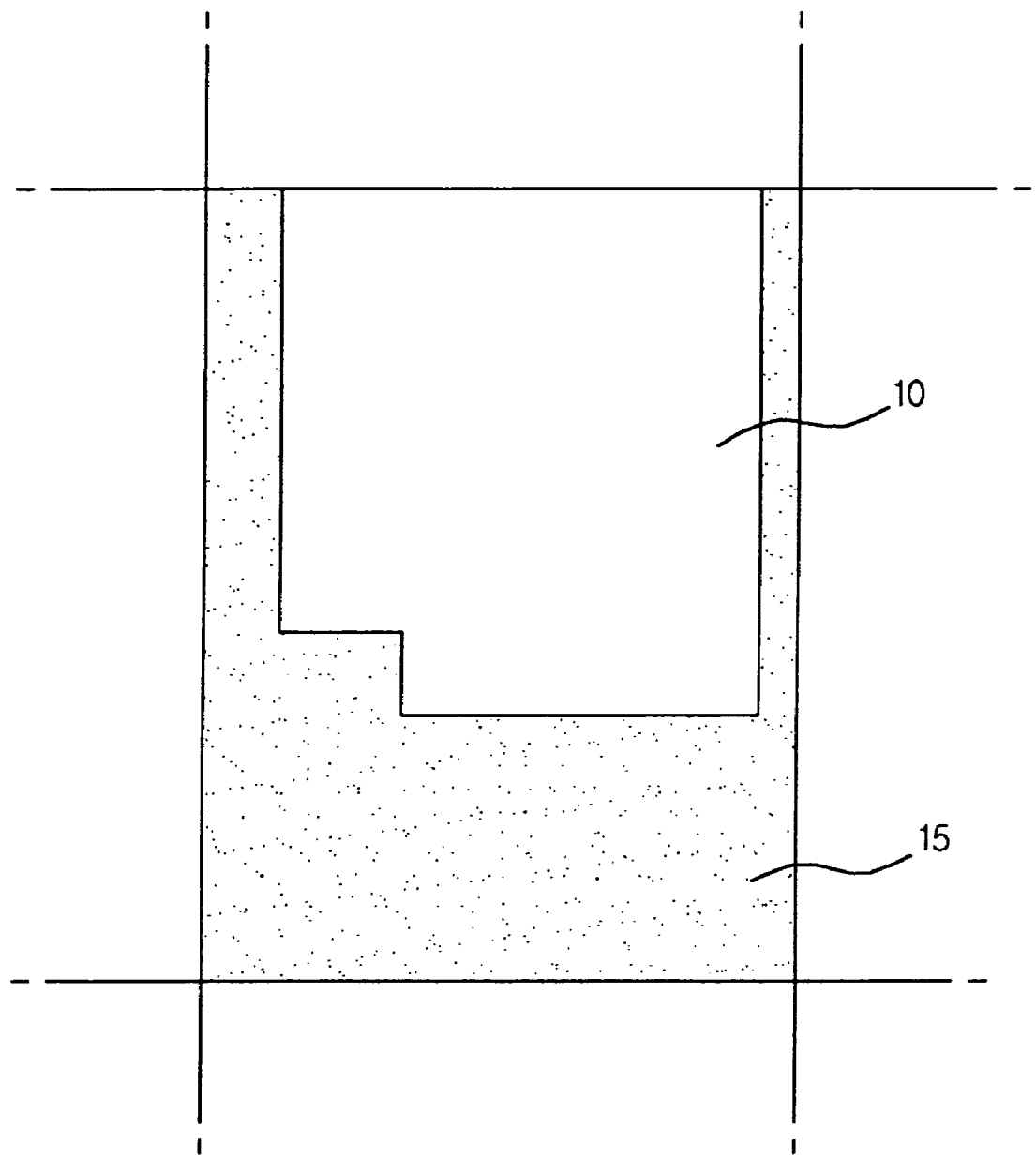
FIG. 2 is a plane view of a color filter structure of a related art liquid crystal display device.
Figure 3:
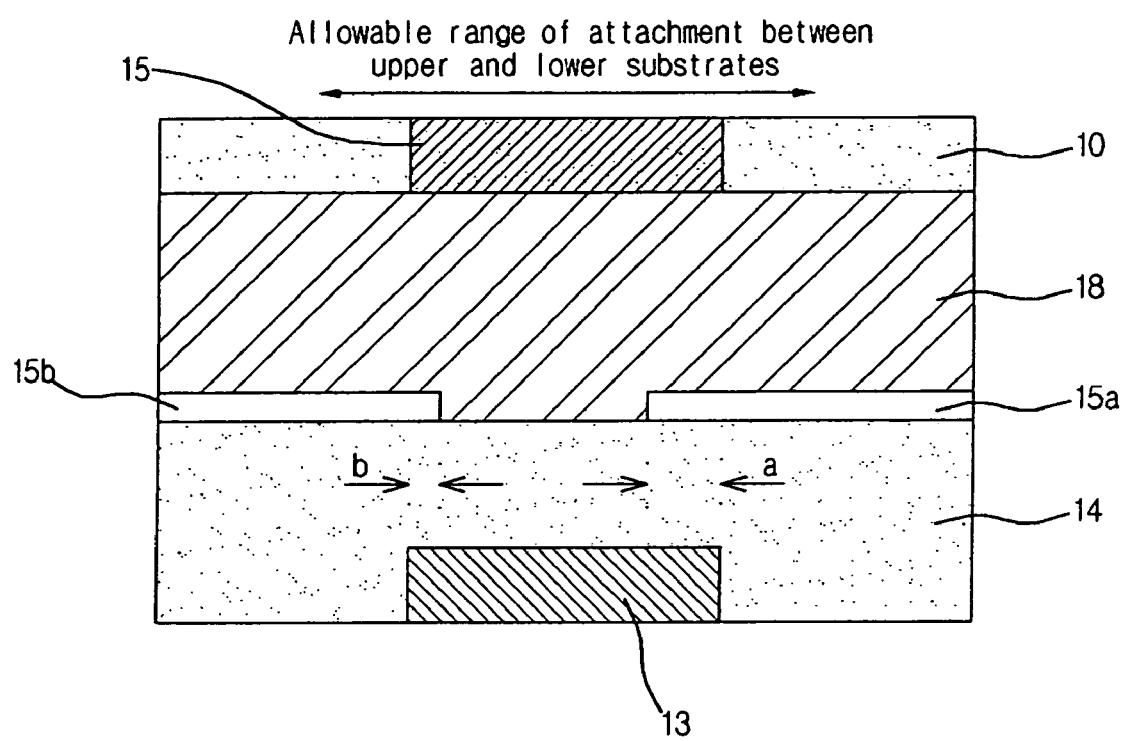
FIG. 3 is a cross-sectional view of the pixel structure of the related art liquid crystal display device.

The dotted line of FIG. 5 represents a region, shown in FIG. 2, in which the black matrix is formed. As a result, according to the present invention, the region of the black matrix with respect to the respective pixel regions is reduced, such that an aperture ratio is increased as described above.

According to another embodiment of the present invention, an uppermost surface of the array substrate is rubbed in the 225 degree direction. In this case, liquid crystals interpose between the array substrate and the color filter substrate are twisted in the +90 degree direction, when applying an electric field is applied thereto.

In case of rubbing the uppermost surface of the array substrate in the above-described direction, the overlapping widths "a" and "b" between the pixel electrode 29a and the data bus lines 23a and 23b are opposite to widths rubbed in the 315 degree direction. In other words, the overlapping width "a" between the pixel electrode 29a and the data bus line (Dn:23a) is in the range of about 0 to 2 micrometers (μm), and the overlapping width "B" between the pixel electrode and the adjacent data bus line (Dn+1:23b) is in the range of about 3 to 5 micrometers (μm).

At this time, an overlapping width "c" between the pixel electrode 29a and the gate bus line (Gn:21) is in the range of about 2 to 4 micrometers (μm), and an overlapping width "d" between the adjacent pixel electrode 29b and the gate bus line (Gn:21) is in the range of about 4 to 6 micrometers (μm). Additionally, as shown in FIG. 5, in the black matrix 35 formed on the color filter 30 corresponding to the array substrate, the width of the black matrix 35 corresponding to the gate bus line (Gn) disposed in the pixel region formed on the array substrate is equal to or less than half of the width of the gate bus line (Gn), or the black matrix corresponding to the gate bus line can be removed. Additionally, the width of the black matrix corresponding to the data bus is equal to or less than half of the width of the data bus. Thus, the pixel structure of the present invention increases an aperture ratio.

Figure 6:
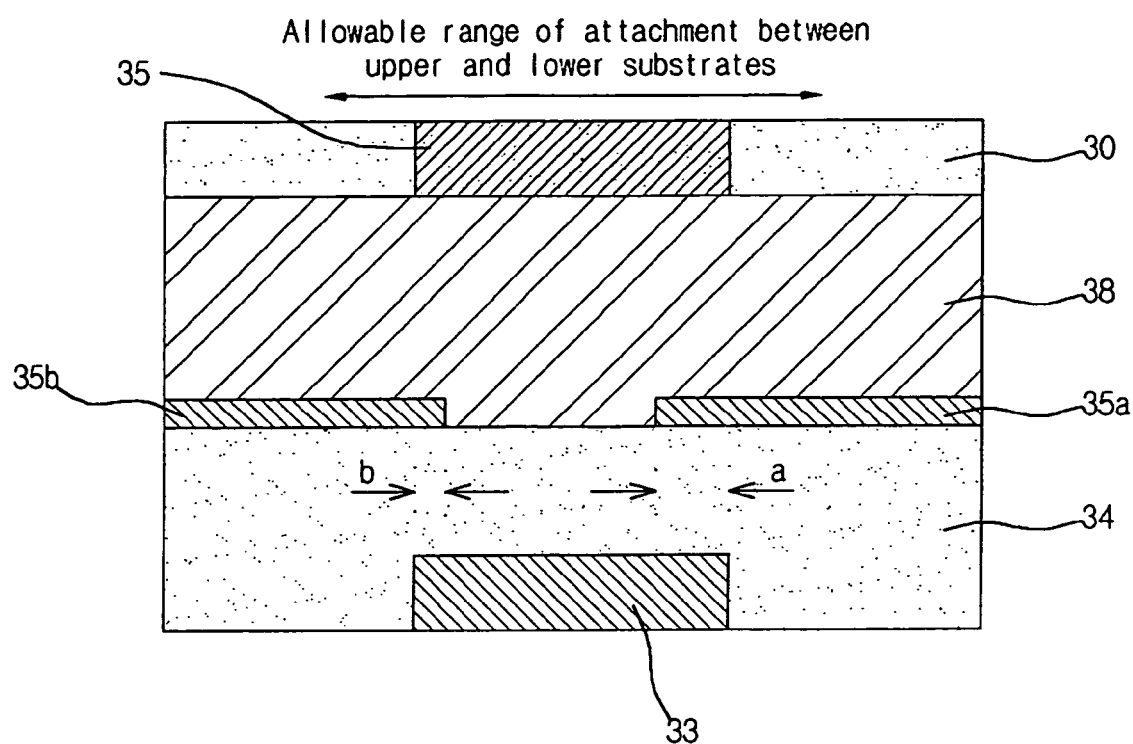
FIG. 6 is a cross-sectional view of the pixel structure of the liquid crystal display device according to the present invention.

FIG. 6 is a cross-sectional view of the pixel structure of the liquid crystal display device according to the present invention.

Referring to FIG. 6, the gate bus line, the TFT, and the data bus line 33 are formed on the transparent insulating substrate, and the organic insulating layer 34 is formed on the array substrate on which the data bus line 33 and the TFT are formed.

The color filter substrate is arranged on the upper surface to correspond to the array substrate. The black matrix 35 and the color filter layer 30 are formed on the transparent insulating substrate to correspond to the unit pixels formed on the array substrate.

A pixel electrode 35a is formed to overlap the data bus line 33. The overlapping width "a" between the pixel electrode 35a and the data bus line 33 is different from the overlapping width "b" between the adjacent pixel electrode 35a and the data bus line 33.

The overlapping width "a" between the pixel electrode 35a and the data bus line 33 is in the range of about 3 to 5 micrometers (μm) or in the range of about 0 to 2 micrometers (μm) according to the rubbing direction of the liquid crystal molecules disposed in the array substrate. The overlapping width "b" between the adjacent pixel electrode 35b and the data bus line 33 is in the range of about 0 to 2 micrometers (μm) or in the range of about 3 to 5 micrometers (μm) according to the rubbing direction of the liquid crystal molecules disposed in the array substrate.

In other words, according to the rubbing direction, if the overlapping width "a" is in the range of about 3 to 5 micrometers (μm), the overlapping width "b" is in the range of about 0 to 2 micrometers (μm). If the overlapping width "a" is in the range of about 0 to 2 micrometers (μm), the overlapping width "b" is in the range of about 3 to 5 micrometers (μm). In more detail, in the case of rubbing the uppermost surface of the array substrate in the 315 degree direction, the overlapping width "a" is in the range of about 3 to 5 micrometers (μm), and the overlapping width "b" is in the range of about 0 to 2 micrometers (μm). In the case of rubbing the uppermost surface of the array substrate in the 225 degree direction, the overlapping width "a" is in the range of about 0 to 2 micrometers (μm), and the overlapping width "b" is in the range of about 3 to 5 micrometers (μm).

A method for increasing an aperture ratio of the LCD according to the present invention will be described as follows. As described above, according to the method of the present invention, since an organic insulating layer is used, the pixel electrode 35a is expanded, so that the adjacent gate bus lines can be formed to overlap the data bus lines 33.

First, the gate electrode and the gate bus line are formed on the transparent insulating substrate. Then, a gate insulating layer, a channel layer, an ohmic contact layer, and a source/drain electrode are formed thereon. Subsequently, a TFT and a data bus line are formed.

An organic insulating layer is formed on the insulating substrate including the TFT having a thickness of about 2.5 to 3 micrometers (μm).

Here, a refractive index of the organic insulating layer is in the range of about 1.5 to 1.6, and a dielectric constant of the organic insulating layer is in the range of about 3.3 to 3.5.

The refractive index and the dielectric constant are specific values required to prevent a light leakage occurring at edge portions of the pixel regions due to the expansion of the pixel electrode on the unit pixel region.

Then, a metal layer such as ITO is deposited on the insulating substrate on which the organic insulating layer, and the metal layer is etched to form the pixel electrode overlapping predetermined portions of the gate bus line, the data bus line, the adjacent gate bus line, and the adjacent data bus line, thereby defining the pixel region.

Accordingly, the present invention can reduce an aperture ratio and prevent a light leakage by overlapping the pixel electrode and the predetermined portions of the gate bus lines and the data bus lines.

Further, due to the expansion of the pixel electrode, an aperture ratio is not reduced by narrowing the width of the black matrix, formed on the color filter to prevent a light leakage.

As described above, the present invention can increase an aperture ratio by overlapping the pixel electrode and portions of the gate bus lines and the data bus lines, which surround the unit pixels.

Further, by controlling the overlapped portion of the pixel electrode, the present invention can reduce the width of the black matrix formed on the color filter substrate in order to prevent a light leakage.

It will be apparent to those skilled in the art that various modifications and variations can be made in the liquid crystal display device of the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
a color filter substrate having a black matrix, and color filter layers at a designated region determined by the black matrix;
an array substrate having a gate bus line and a data bus line crossing perpendicularly and defining a unit pixel region, a thin film transistor arranged at an intersection of the gate bus line and the data bus line, a pixel electrode contacting a drain electrode of the thin film transistor and vertically overlapping portions of the gate bus line, the data bus line, an adjacent gate bus line, and an adjacent data bus line, wherein the pixel electrode and the gate bus line have an overlapping width in a range of about 2 to 4 micrometers (μm), and the pixel electrode and the adjacent gate bus line have an overlapping width in a range of about 4 to 6 micrometers (μm);
an organic insulating layer on the pixel electrode and the thin film transistor, wherein a surface of the array substrate is rubbed in a 225 degree direction; and
a liquid crystal layer including a liquid crystals between the array substrate and the color filter substrate,
wherein the liquid crystals at the surface of the color filter substrate are twisted in the 90 degree direction, when applying an electric field is applied thereto,
wherein the overlapping width between the gate bus line and the pixel electrode and the overlapping width between the adjacent gate bus line and the pixel electrode are different,
wherein the black matrix corresponding to a region of the gate bus line is formed having a width equal to or less than half of the width of the gate bus line, and
wherein the pixel electrode is not overlapped a source electrode of the thin film transistor.

2. The liquid crystal display device of claim 1, wherein the black matrix corresponding to a region of the data bus line is formed having a width equal to or less than half of the width of the data bus line.

3. The liquid crystal display device of claim 1, wherein the organic insulating layer has a thickness of about 2.5 to 3 micrometers (μm).

4. The liquid crystal display device of claim 1, wherein the organic insulating layer has a reflective index in a range of about 1.5 to 1.6.

5. The liquid crystal display device of claim 1, wherein the organic insulating layer has a dielectric constant in a range of about 3.3 to 3.5.

6. A liquid crystal display device, comprising:
a color filter substrate having a black matrix, and color filter layers at a designated region determined by the black matrix;
an array substrate having a gate bus line and a data bus line crossing perpendicularly and defining a unit pixel region, a thin film transistor arranged at an intersection of the gate bus line and the data bus line, a pixel electrode contacting a drain electrode of the thin film transistor and vertically overlapping portions of the gate bus line, the data bus line, an adjacent gate bus line, and an adjacent data bus line, wherein the pixel electrode and the data bus line have an overlapping width in a range of about 0 to 2 micrometers (μm), and the pixel electrode and the adjacent data bus line have an overlapping width in a range of about 3 to 5 micrometers (μm), wherein the pixel electrode and the gate bus line have an overlapping width in a range of about 2 to 4 micrometers (μm), and the pixel electrode and the adjacent gate bus line have an overlapping width in a range of about 4 to 6 micrometers (μm);
an organic insulating layer on the pixel electrode and the thin film transistor, wherein a surface of the array substrate is rubbed in a 225 degree direction; and
a liquid crystal layer including a liquid crystals between the array substrate and the color filter substrate,
wherein the liquid crystals at the surface of the color filter substrate are twisted in the 90 degree direction, when applying an electric field is applied thereto, and
wherein the pixel electrode is not overlapped a source electrode of the thin film transistor.

7. A liquid crystal display device, comprising:
a color filter substrate having a black matrix, and color filter layers at a designated region determined by the black matrix;
an array substrate having a gate bus line and a data bus line crossing perpendicularly and defining a unit pixel region, a thin film transistor arranged at an intersection of the gate bus line and the data bus line, a pixel electrode contacting a drain electrode of the thin film transistor and vertically overlapping portions of the gate bus line, the data bus line, an adjacent gate bus line, and an adjacent data bus line, wherein the pixel electrode and the gate bus line have an overlapping width in a range of about 2 to 4 micrometers (μm), and the pixel electrode and the adjacent gate bus line have an overlapping width in a range of about 4 to 6 micrometers (μm);
an organic insulating layer on the pixel electrode and the thin film transistor, wherein a surface of the array substrate is rubbed in a 225 degree direction; and
a liquid crystal layer including a liquid crystals between the array substrate and the color filter substrate,
wherein the liquid crystals at the surface of the color filter substrate are twisted in the 90 degree direction, when applying an electric field is applied thereto, and
wherein the pixel electrode is not overlapped a source electrode of the thin film transistor.

8. The liquid crystal display device of claim 7, wherein the overlapping width between the data bus line and the pixel electrode and the overlapping width between the adjacent data bus line and the pixel electrode are different.

* * * * *